US012686244B2

(12) United States Patent
Riahi et al.

(10) Patent No.: US 12,686,244 B2
(45) Date of Patent: Jul. 21, 2026

(54) HEATING SYSTEM FOR FOOD TRANSPORTATION

(71) Applicants: Alireza Riahi, Tehran (IR); Shahin Jabari, Tehran (IR); Hassan Jafari Mosleh, Hamedan (IR); Amirreza Mehdizadeh, Bijar (IR); Mohammad Behshad Shafii, Tehran (IR)

(72) Inventors: Alireza Riahi, Tehran (IR); Shahin Jabari, Tehran (IR); Hassan Jafari Mosleh, Hamedan (IR); Amirreza Mehdizadeh, Bijar (IR); Mohammad Behshad Shafii, Tehran (IR)

( * ) Notice: Subject to any disclaimer, the term of this patent is extended or adjusted under 35 U.S.C. 154(b) by 818 days.

(21) Appl. No.: 17/408,446

(22) Filed: Aug. 22, 2021

(65) Prior Publication Data

US 2021/0379961 A1     Dec. 9, 2021

Related U.S. Application Data

(60) Provisional application No. 63/124,736, filed on Dec. 12, 2020.

(51) Int. Cl.
| | |
|---|---|
| *B62H 1/00* | (2006.01) |
| *B60H 1/00* | (2006.01) |
| *B60H 1/20* | (2006.01) |
| *B62J 9/23* | (2020.01) |
| *B62J 9/28* | (2020.01) |
| *B62J 50/00* | (2020.01) |
| *B62J 50/30* | (2020.01) |

(52) U.S. Cl.
CPC ....... *B60H 1/00328* (2013.01); *B60H 1/0025* (2013.01); *B60H 1/20* (2013.01); *B62J 9/23*

(2020.02); *B62J 9/28* (2020.02); *B62J 50/00* (2020.02); *B62J 50/30* (2020.02)

(58) Field of Classification Search
CPC ....... B62J 50/00; B62J 9/28; B62J 9/23; B62J 50/30; B60H 1/20; B60H 1/00328; B60H 1/0025
See application file for complete search history.

(56) References Cited

U.S. PATENT DOCUMENTS

| | | | | |
|---|---|---|---|---|
| 3,570,590 | A | * | 3/1971 | Kofink ...................... B60H 1/20 |
| | | | | 165/142 |
| 4,775,102 | A | * | 10/1988 | Negishi .................... B60H 1/20 |
| | | | | 237/12.3 A |
| 5,505,122 | A | * | 4/1996 | Gerrit ................ B60H 1/00264 |
| | | | | 219/400 |
| 5,582,095 | A | * | 12/1996 | Rial ........................ A47J 47/14 |
| | | | | 296/22 |

(Continued)

*Primary Examiner* — Alfred Basichas

(57)     ABSTRACT

A heating system configured to be mounted on a motorcycle may include a food container. The heating system may further include a first coiled pipe mounted within the food container configured to heat the food container and a second coiled pipe coiled around an exhaust pipe of the motorcycle connected in fluid communication with the first coiled pipe. A working fluid may be circulated within a closed loop formed by first coiled pipe and the second coiled pipe utilizing a pumping mechanism. The working fluid may absorb heat from the exhaust pipe of the motorcycle as the working fluid flows through the second coiled pipe, and the working fluid may release the absorbed heat to the food container as the working fluid flows through the first coiled pipe.

12 Claims, 6 Drawing Sheets

(56) References Cited

U.S. PATENT DOCUMENTS

| | | | | |
|---|---|---|---|---|
| 5,676,051 A | * | 10/1997 | Sinemus ............... | A47J 47/145 |
| | | | | 99/476 |
| 2005/0091988 A1 | * | 5/2005 | Stewart ................... | B60P 3/007 |
| | | | | 62/3.61 |
| 2016/0152295 A1 | * | 6/2016 | Cervino ................. | B62K 19/46 |
| | | | | 180/219 |
| 2020/0015632 A1 | * | 1/2020 | Prada ..................... | B60H 3/024 |

* cited by examiner

100

300

302

304

<u>400</u>

Absorbing heat dissipated from an exhaust pipe of the motorcycle. — 402

Releasing the absorbed heat within a food container mounted on the motorcycle. — 404

HEATING SYSTEM FOR FOOD TRANSPORTATION

CROSS-REFERENCE TO RELATED APPLICATION

This application claims the benefit of priority from pending U.S. Provisional Patent Application Ser. No. 63/124,736, filed on Dec. 12, 2020, and entitled "HYGIENIC HEATING AND COOLING BOX FOR FOOD TRANSPORTATION BY MOTOR COURIERS USING THERMAL COILS," which is incorporated herein by reference in its entirety.

TECHNICAL FIELD

The present disclosure relates to food delivery systems, particularly to heating/cooling boxes for food transportation. More particularly, the present disclosure relates to a heating system for food transportation by motorcycle couriers.

BACKGROUND

Maintaining the quality of food during deliveries, such that the original smell and flavor of the delivered food is preserved is of utmost importance for courier services. This is especially true for hot food, such as pizzas, fried chicken, and hamburgers which must be delivered to customers at a perfect temperature to preserve their quality as much as possible.

One way to address this is utilizing thermal bags or heated food delivery boxes that may be carried by or may be mountable on motorcycles. An external heat source, such as a thermal element, may be used to keep a food delivery box warm. However, utilizing a thermal element may require a considerable amount of energy that may be provided by utilizing battery packs in a food delivery box or installing solar panels on a food delivery box. Other heating solutions, such as planar heaters and infrared heaters that may be powered by the battery of a motorcycle may also be utilized for heating a food delivery box.

In another approach, the exhaust gas of a motorcycle may be circulated in a food delivery box via tubes attached to an exhaust of a motorcycle. However, using exhaust gas recirculation is not a safe approach due to the possibility of exhaust gas leakage into a food delivery box and a pressure increase at the exhaust, which may damage the motorcycle.

There is, therefore, a need for a simple and energy efficient method for heating a food delivery box utilizing the heat generated by the motor of a motorcycle. In other words, there a need for a safer and more efficient method for utilizing the exhaust heat instead of recirculating the exhaust gas within a food delivery box.

SUMMARY

This summary is intended to provide an overview of the subject matter of the present disclosure and is not intended to identify essential elements or key elements of the subject matter, nor is it intended to be used to determine the scope of the claimed implementations. The proper scope of the present disclosure may be ascertained from the claims set forth below in view of the detailed description and the drawings.

According to one or more exemplary embodiments, the present disclosure is directed to a heating system for food transportation. An exemplary heating system may be configured to be mounted on a motorcycle. An exemplary heating system may include a food container that may be configured to be mounted on a motorcycle. An exemplary food container may include at least one inner chamber.

An exemplary heating system may further include a first heat exchanger that may be configured to heat an exemplary inner chamber. An exemplary first heat exchanger may include a first coiled pipe that may be mounted within an exemplary food container. An exemplary heating system may further include a second heat exchanger that may be connected in fluid communication with an exemplary first heat exchanger. An exemplary second heat exchanger may include a second coiled pipe coiled around an exhaust pipe of an exemplary motorcycle.

An exemplary heating system may further include a working fluid that may be contained within an exemplary first coiled pipe and an exemplary second coiled pipe. An exemplary heating system may further include a pumping mechanism that may be configured to urge an exemplary working fluid to flow through an exemplary first coiled pipe and an exemplary second coiled pipe in a closed circulation loop. An exemplary working fluid may be configured to absorb heat from an exemplary exhaust pipe of an exemplary motorcycle as an exemplary working fluid flows through an exemplary second coiled pipe, and an exemplary working fluid may further be configured to release the absorbed heat to an exemplary inner chamber withing as an exemplary working fluid flows through an exemplary first coiled pipe.

In an exemplary embodiment, a first end of an exemplary first coiled pipe may be connected to a first end of an exemplary second coiled pipe, and a second end of an exemplary first coiled pipe may be connected to a second end of an exemplary second coiled pipe via an exemplary pumping mechanism.

In an exemplary embodiment, an exemplary pumping mechanism is configured to urge an exemplary working fluid to flow through an exemplary first coiled pipe from an exemplary first end of an exemplary first coiled pipe toward an exemplary second end of an exemplary first coiled pipe, an exemplary pumping mechanism further configured to pump an exemplary working fluid from an exemplary second end of an exemplary first coiled pipe to an exemplary second end of an exemplary second coiled pipe, an exemplary pumping mechanism further configured to urge an exemplary working fluid to flow within an exemplary second coiled pipe from an exemplary second end of the second coiled pipe toward an exemplary first end of an exemplary second coiled pipe.

In an exemplary embodiment, an exemplary heating system may further include a reservoir that may be mounted between an exemplary second end of an exemplary first coiled pipe and an exemplary pumping mechanism. An exemplary reservoir may be configured to accumulate an exemplary working fluid upstream from an exemplary pumping mechanism.

In an exemplary embodiment, an exemplary first coiled pipe and an exemplary second coiled pipe may be made of heat conducting materials. In an exemplary embodiment, an exemplary second coiled pipe may be coiled around a portion of an exemplary exhaust pipe between an engine of an exemplary motorcycle and a muffler of an exemplary exhaust pipe of an exemplary motorcycle. In an exemplary embodiment, an exemplary second coiled pipe may be in direct contact with an outer surface of an exemplary exhaust pipe of an exemplary motorcycle, and an exemplary second coiled pipe may be insulated from the environment.

In an exemplary embodiment, an exemplary food container may further include a first divider. An exemplary first divider may be configured to divide an inner volume of an exemplary food container into an exchanger housing and an exemplary inner chamber. An exemplary exchanger housing may be configured to house an exemplary first heat exchanger. An exemplary food container may further include a fan. An exemplary fan may be configured to circulate the air between an exemplary inner chamber and an exemplary exchanger housing.

In an exemplary embodiment, an exemplary inner chamber may include a heated chamber and a cold chamber. An exemplary heated chamber may be in fluid communication with an exemplary exchanger housing via an exemplary fan. An exemplary cold chamber may be isolated from an exemplary heated chamber utilizing a second divider. An exemplary second divider may include a heat isolating material.

In an exemplary embodiment, an exemplary inner chamber may further include at least one ultraviolet light source. An exemplary ultraviolet light source may be configured to shine ultraviolet light within an exemplary inner chamber.

According to one or more exemplary embodiments, the present disclosure is further directed to a method for heating food during food transportation. An exemplary method may include absorbing heat dissipated from an outer surface of an exhaust pipe of the motorcycle into a working fluid by pumping the working fluid through a first pipe coiled around the exhaust pipe of the motorcycle, and releasing the absorbed heat from the working fluid into at least one inner chamber of a food container.

BRIEF DESCRIPTION OF THE DRAWINGS

The novel features which are believed to be characteristic of the present disclosure, as to its structure, organization, use and method of operation, together with further objectives and advantages thereof, will be better understood from the following drawings in which a presently exemplary embodiment of the present disclosure will now be illustrated by way of example. It is expressly understood, however, that the drawings are for illustration and description only and are not intended as a definition of the limits of the present disclosure. Embodiments of the present disclosure will now be described by way of example in association with the accompanying drawings in which.

DETAILED DESCRIPTION

Figure 1:
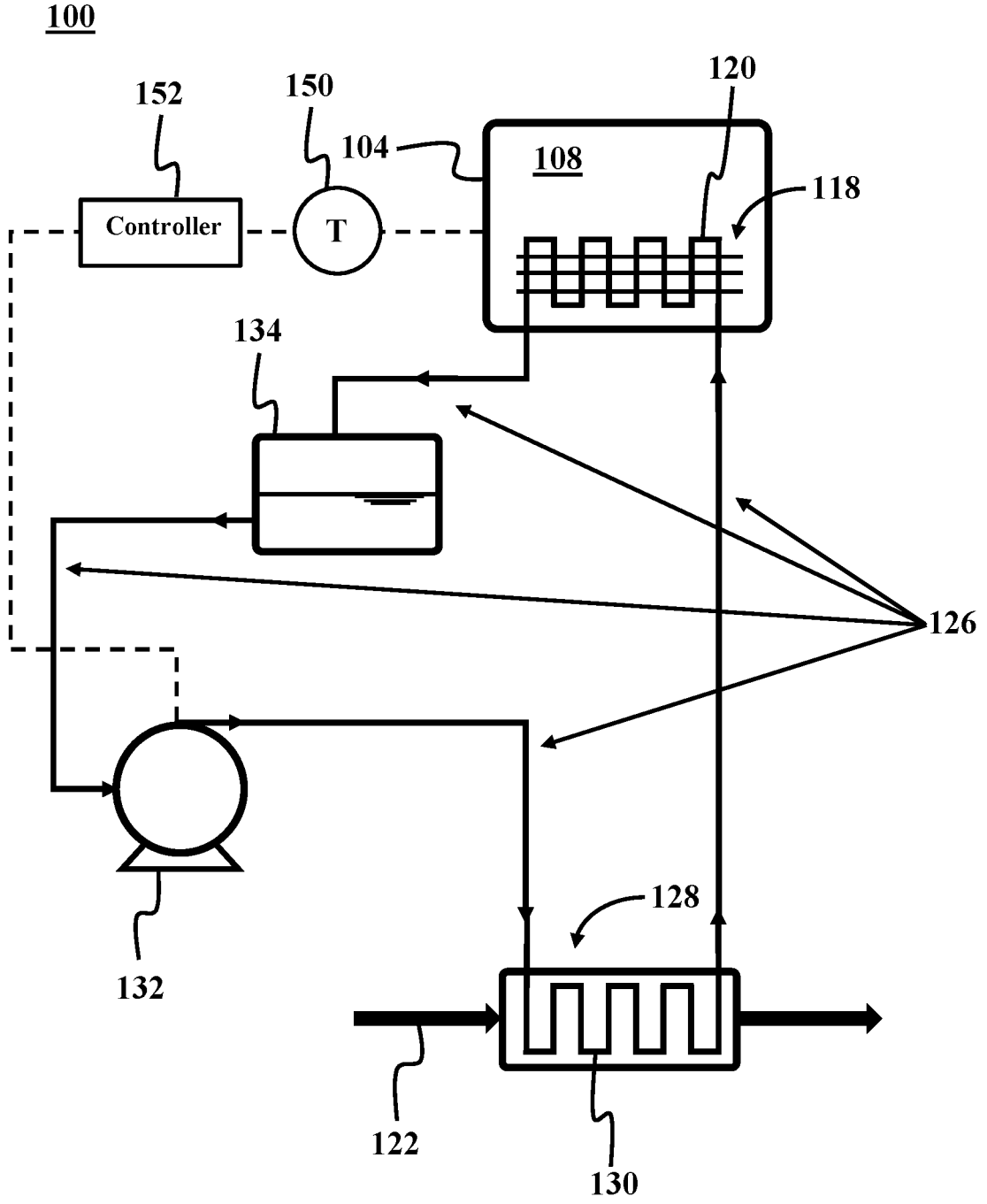
FIG. 1 illustrates a flow diagram of a heating system for food transportation, consistent with one or more exemplary embodiments of the present disclosure.

The novel features which are believed to be characteristic of the present disclosure, as to its structure, organization, use and method of operation, together with further objectives and advantages thereof, will be better understood from the following discussion.

The present disclosure is directed to exemplary embodiments of a heating system for food transportation. An exemplary heating system may utilize the heat dissipated from an exhaust pipe of a motorcycle to heat up food within an exemplary food container of an exemplary heating system. An exemplary heating system may include a first coiled pipe that may be positioned within an exemplary food container, where an exemplary first coiled pipe may release heat into an inner volume of an exemplary food container responsive to a hot fluid flowing through an exemplary first coiled pipe. An exemplary first coiled pipe may be connected in fluid communication with a second coiled pipe. An exemplary second coiled pipe may be coiled around an exemplary exhaust pipe of an exemplary motorcycle. The heat dissipated from an outer wall of an exemplary exhaust pipe may be transferred to an exemplary second coiled pipe and may heat up any suitable working fluid flowing within an exemplary second coiled pipe.

As mentioned before, an exemplary second coiled pipe may be connected in fluid communication with an exemplary first coiled pipe. As used herein, being connected in fluid communication may refer to an exemplary first coiled pipe and an exemplary second coiled pipe being connected in a closed loop utilizing insulated pipes. Furthermore, an exemplary pumping mechanism may be coupled with an exemplary closed loop formed by an exemplary first coiled pipe and an exemplary second coiled pipe to circulate a suitable working fluid, such as water within an exemplary closed loop.

An exemplary working fluid may absorb the dissipated heat from an exemplary exhaust pipe of an exemplary motorcycle as an exemplary working fluid flows through an exemplary second coiled pipe. An exemplary working fluid may release heat in an inner volume of an exemplary food container as an exemplary working fluid is flowing through an exemplary first coiled pipe.

In an exemplary embodiment, such heating system may be mounted on a food delivery motorcycle, where an exemplary food container may be mounted on the back of an exemplary motorcycle and the heat released by an engine of an exemplary motorcycle through an exemplary exhaust pipe may be extracted utilizing an exemplary working fluid flowing through an exemplary second coiled pipe mounted around an exemplary exhaust pipe. The extracted heat may then be transferred into an exemplary food container via an exemplary second coiled pipe. Such indirect heat transfer utilizing an exemplary working fluid being pumped and circulated within an exemplary first coiled pipe and an exemplary second coiled pipe may prevent poisonous exhaust gases to come in direct contact with food in case of any possible leakages in an exemplary system. Moreover, such indirect heat transfer may allow for a natural flow of exhaust gases through an exemplary exhaust pipe of an exemplary motorcycle without any scavenging system intercepting the flow of hot exhaust gases. Consequently, no extra pressure is exerted on an engine of an exemplary motorcycle.

FIG. 1 illustrates a flow diagram of a heating system 100 for food transportation, consistent with one or more exemplary embodiments of the present disclosure. In an exemplary embodiment, heating system 100 may include a food container 104 that may be configured to be mounted on a motorcycle (not illustrated). In an exemplary embodiment, food container 104 may include at least one inner chamber 108 that may be configured to house food or other items that need to remain heated. In an exemplary embodiment, inner walls of food container 104 may be insulated utilizing suitable insulation, such as a ceramic fiber blanket or glass wool.

In an exemplary embodiment, heating system 100 may further include a first heat exchanger 118 that may be configured to heat at least one inner chamber 108. In an exemplary embodiment, first heat exchanger 118 may include a first coiled pipe 120 that may be mounted or installed inside food container 104. In an exemplary embodiment, first coiled pipe 120 may be a planar coiled pipe that may be mounted on at least one of the inner walls of food container 104, for example, first coiled pipe 120 may be mounted on a floor of food container 104.

In an exemplary embodiment, heating system 100 may further include a second heat exchanger 128 that may be connected in fluid communication with first heat exchanger 118. In an exemplary embodiment, second heat exchanger 128 may include a second coiled pipe 130 that may be coiled around an exhaust pipe (not illustrated) of a motorcycle (not illustrated), such that second coiled pipe 130 may be in an indirect contact with a hot gas stream 122 flowing through an exemplary exhaust pipe of an exemplary motorcycle. In an exemplary embodiment, a working fluid may be contained within first coiled pipe 120 and second coiled pipe 130. As used herein, first coiled pipe 120 and second coiled pipe 130 being in fluid communication may refer to first coiled pipe 120 and second coiled pipe 130 being connected to each other utilizing pipes or tubes, such that the working fluid may flow between first coiled pipe 120 and second coiled pipe 130.

In an exemplary embodiment, heating system 100 may further include a pumping mechanism 132 that may be configured to urge the working fluid to flow through first coiled pipe 120 and second coiled pipe 130 in a closed circulation loop. In other words, first coiled pipe 120 and second coiled pipe 130 may form a closed loop, in which the working fluid may be circulated utilizing pumping mechanism 132. In an exemplary embodiment, heating system 100 may further include a reservoir 134 that may be connected in fluid communication with pumping mechanism 132. In an exemplary embodiment, reservoir 134 may be configured to allow for accumulating an exemplary working fluid upstream from pumping mechanism 132.

In an exemplary embodiment, when hot gas stream 122 is discharged from an engine of an exemplary motorcycle through an exemplary exhaust pipe of an exemplary motorcycle, a considerable portion of the thermal energy of hot gas stream 122 may be dissipated from an outer wall of an exemplary exhaust pipe. Such dissipated heat may be transferred to second coiled pipe 130 and consequently, the working fluid may absorb the dissipated heat as the working fluid flows through second coiled pipe 130.

In an exemplary embodiment, the heated working fluid may then be pumped into first coiled pipe 120, where the absorbed heat may be released from the heated working fluid into an inner volume of food container 104. In an exemplary embodiment, such absorption of heat by the working fluid in second coiled pipe 130 and then such release of the absorbed heat within food container 104 from first coiled pipe 120 may allow for an indirect utilization of the thermal energy of hot gas stream 122 to heat up at least one inner chamber 108 of food container 104. As used herein, an indirect utilization of the thermal energy of hot gas stream 122 for heating up food container 104 may refer to transferring the thermal energy of hot gas stream 122 via an exemplary working fluid and not by direct circulation of hot gas stream 122 inside food container 104, which, as mentioned before, may be harmful for both the delivered food and an exemplary engine of an exemplary motorcycle. Specifically, since the heat is being transferred utilizing an exemplary working fluid and not hot gas stream 122 itself, any risk of leakage of poisonous exhaust gases inside food container 104 may be prevented. Furthermore, since hot gas stream 122 is not obstructed by any type of scavenging system to guide the exhaust gasses into food container 104, no extra pressure is exerted on an exemplary engine of an exemplary motorcycle and hot gas stream 122 may be discharged as in usual operation of a motorcycle engine.

In an exemplary embodiment, pipes or tubes 126 that may be utilized for connecting first heat exchanger 118 and second heat exchanger 128 may all be insulated to prevent any unwanted heat loss to the surrounding environment. Such insulation of tubes 126 may allow for an exemplary working fluid to preserve the absorbed heat from hot gas stream 122 within second heat exchanger 128 until the absorbed heat may be released from the working fluid as the working fluid flows through first heat exchanger 118. In an exemplary embodiment, first coiled pipe 120 and second coiled pipe 130 may be made of heat conductive materials such as copper to facilitate such heat transfer between an exemplary working fluid and each of hot gas stream 122 and at least one inner chamber 108 of food container 104.

In an exemplary embodiment, heating system 100 may further include a temperature sensor 150 mounted within food container 104 and the sensor 150 may be configured to measure the temperature of at least one inner chamber 108. In an exemplary embodiment, heating system 100 may further include a temperature controller 152 that may be connected to temperature sensor 150. In an exemplary embodiment, temperature controller 152 may be configured to monitor the temperature of at least one inner chamber 108 and allow for controlling the temperature of at least one inner chamber 108 at a desired set point.

In an exemplary embodiment, temperature controller 152 may be configured to receive the temperature of at least one inner chamber 108 from temperature sensor 150 and to compare the received temperature with a set point received from a user interface. In an exemplary embodiment, temperature controller 152 may be coupled to an actuator of pumping mechanism 132 and responsive to the received temperature deviating from the set point, temperature controller 152 may urge pumping mechanism 132 to turn on or off. For example, responsive to the received temperature being higher than the set point, temperature controller 152 may urge pumping mechanism 132 to stop circulating the working fluid.

Figure 2A:
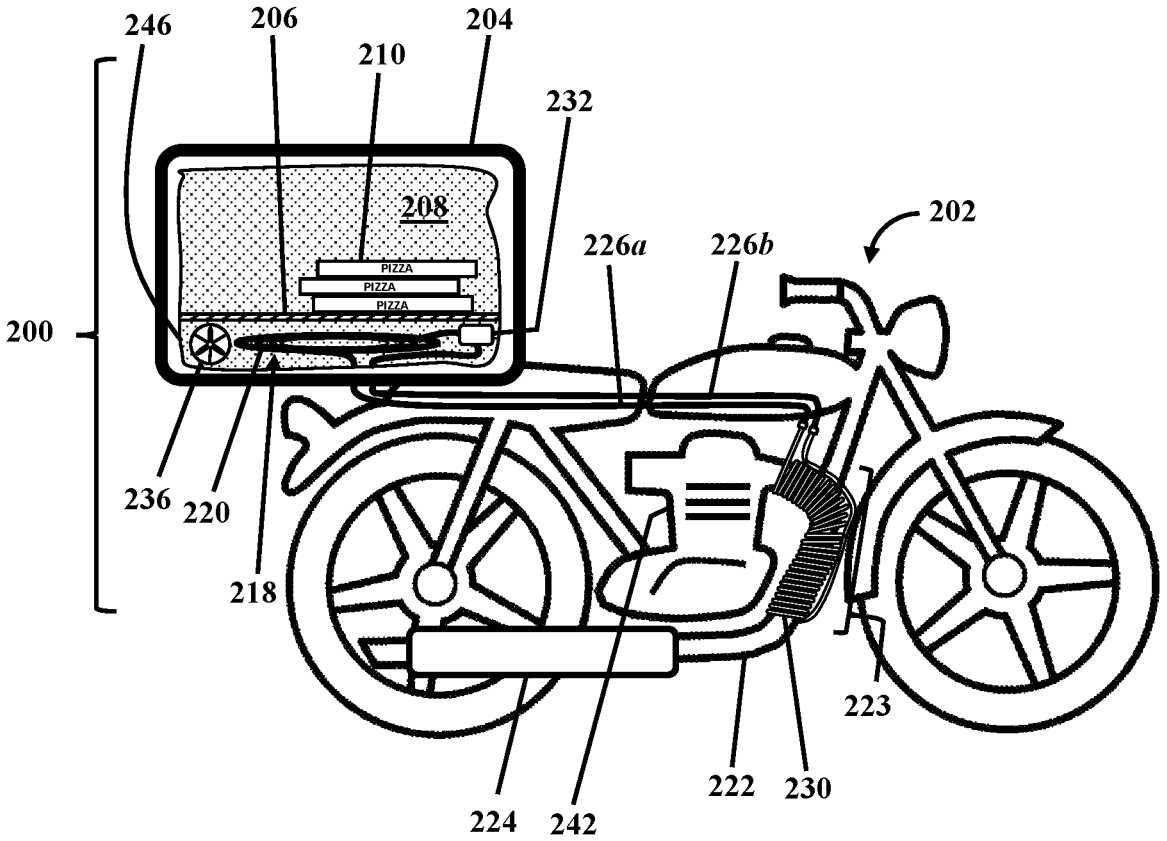
FIG. 2A illustrates a heating system mounted on a motorcycle, consistent with one or more exemplary embodiments of the present disclosure.
Figure 2B:
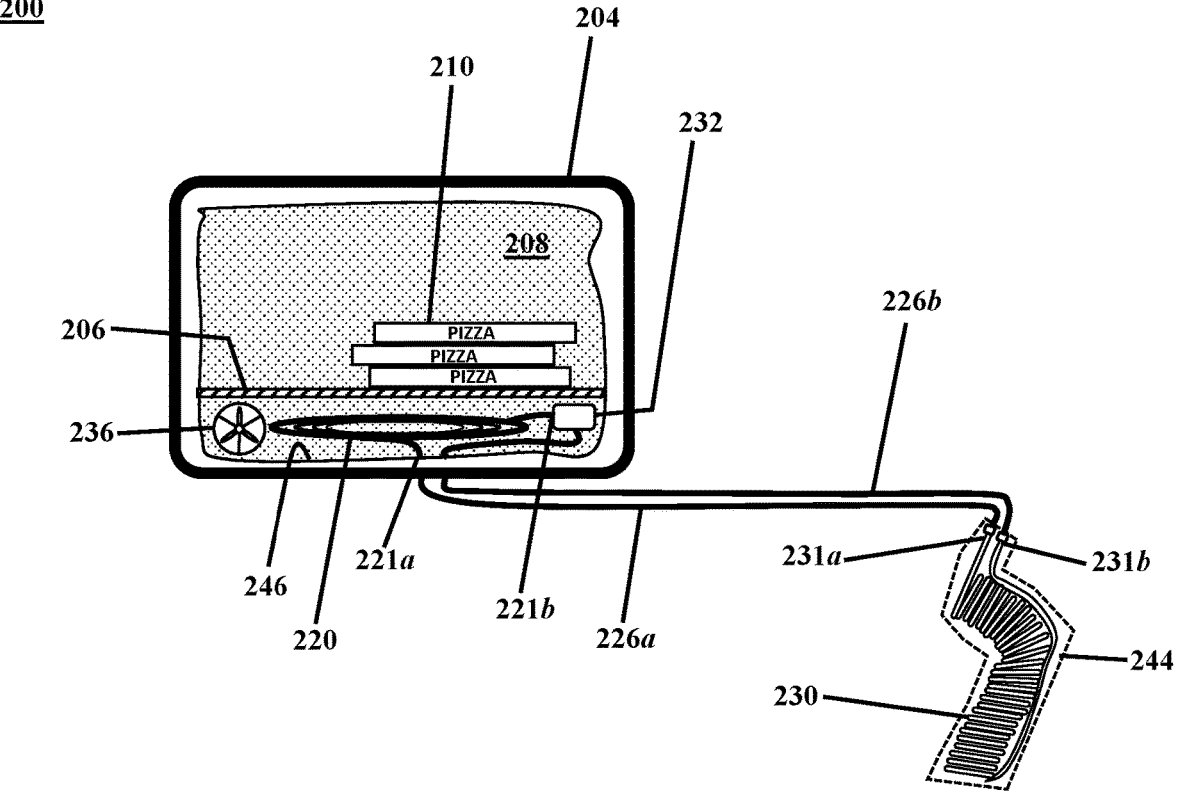
FIG. 2B illustrates a heating system for food transportation, consistent with one or more exemplary embodiments of the present disclosure.

FIG. 2A illustrates a heating system 200 mounted on a motorcycle 202, consistent with one or more exemplary embodiments of the present disclosure. FIG. 2B illustrates heating system 200 for food transportation, consistent with one or more exemplary embodiments of the present disclosure. In an exemplary embodiment, heating system 200 may be structurally and functionally similar to heating system 100.

In an exemplary embodiment, heating system 200 may include a food container 204 similar to food container 104 that may be configured to be mounted on a motorcycle 202. In an exemplary embodiment, food container 204 may include at least one inner chamber 208 similar to at least one inner chamber 108 that may be configured to house food 210. In an exemplary embodiment, food 210 may refer to any hot food or beverages, such as pizzas, fried chicken, hot sandwiches, and coffee or other similar hot beverages.

In an exemplary embodiment, heating system 200 may further include a first heat exchanger 218 similar to first heat exchanger 118 that may be configured to heat at least one inner chamber 208. In an exemplary embodiment, first heat exchanger 218 may include a first coiled pipe 220 similar to first coiled pipe 120 that may be mounted or installed inside food container 204. In an exemplary embodiment, first coiled pipe 220 may be a planar coiled pipe that may be mounted in a bottom portion of at least one inner chamber 208.

In an exemplary embodiment, heating system 200 may further include a second heat exchanger 228 similar to second heat exchanger 128 that may be connected in fluid communication with first heat exchanger 218. In an exemplary embodiment, second heat exchanger 228 may include a second coiled pipe 230 similar to second coiled pipe 130 that may be coiled around an exhaust pipe 222 of motorcycle 202, such that second coiled pipe 230 may be in contact with an outer surface of exhaust pipe 222 of motorcycle 202. In an exemplary embodiment, a working fluid may be contained within first coiled pipe 220 and second coiled pipe 230. As used herein, first coiled pipe 220 and second coiled pipe 230 being in fluid communication may refer to first coiled pipe 220 and second coiled pipe 230 being connected to each other utilizing pipes or tubes, such that the working fluid may flow between first coiled pipe 220 and second coiled pipe 230.

In an exemplary embodiment, heating system 200 may further include a pumping mechanism 232 similar to pumping mechanism 132 that may be configured to urge the working fluid to flow through first coiled pipe 220 and second coiled pipe 230 in a closed circulation loop. In other words, first coiled pipe 220 and second coiled pipe 230 may form a closed loop, in which the working fluid may be circulated utilizing pumping mechanism 232. In an exemplary embodiment, heating system 200 may further include a reservoir (not illustrated) similar to reservoir 134 that may be connected in fluid communication with pumping mechanism 232. In an exemplary embodiment, the reservoir may be configured to allow for accumulating an exemplary working fluid upstream from pumping mechanism 232.

In an exemplary embodiment, when a hot gas stream is discharged from an engine 242 of motorcycle 202 through exhaust pipe 222 of motorcycle 202, a considerable portion of the thermal energy of the discharged hot gas stream may be dissipated from the outer surface of exhaust pipe 222. Since second coiled pipe 230 is mounted around and in direct contact with the outer surface of exhaust pipe 222, such dissipated heat may be transferred to an exemplary working fluid flowing through second coiled pipe 230. In other words, an exemplary working fluid may absorb the dissipated heat as the working fluid flows through second coiled pipe 230. In an exemplary embodiment, the heated working fluid may then be pumped into first coiled pipe 220, where the absorbed heat may be released from the heated working fluid into an inner volume of food container 204. In an exemplary embodiment, such absorption of heat by the working fluid in second coiled pipe 230 and then such release of the absorbed heat within food container 204 from first coiled pipe 220 may allow for an indirect utilization of the thermal energy of discharged hot gas stream from the engine of motorcycle 202 to heat up at least one inner chamber 208 of food container 204. As used herein, an indirect utilization of the thermal energy of the hot gas stream for heating up food container 204 may refer to transferring the thermal energy of the hot gas stream via an exemplary working fluid and not by direct circulation of the hot gas stream inside food container 204, which, as mentioned before, may be harmful for both the delivered food and the engine of motorcycle 202. Specifically, since the heat is being transferred utilizing an exemplary working fluid and not the discharged hot gas stream itself, any risk of leakage of poisonous exhaust gases inside food container 204 may be prevented. Furthermore, since the hot gas stream flowing through exhaust pipe 222 is not obstructed by any type of scavenging system to guide the exhaust gasses into food container 204, no extra pressure is exerted on the engine of motorcycle 202 and the hot gas stream 122 may be discharged as usual from an outlet end of exhaust pipe 222.

In an exemplary embodiment, first coiled pipe 220 and second coiled pipe 230 may be made of heat conductive materials such as copper to facilitate such heat transfer between an exemplary working fluid and each of exhaust pipe 222 and at least one inner chamber 208 of food container 204. In an exemplary embodiment, an exemplary working fluid may include any suitable fluid with a high heat capacity, such as water.

In an exemplary embodiment, a first end 221a of first coiled pipe 220 may be connected to a first end 231a of second coiled pipe 230, and a second end 221b of first coiled pipe 220 may be connected to a second end 231b of second coiled pipe 230 utilizing pumping mechanism 232. In an exemplary embodiment, first end 221a of first coiled pipe 220 may be connected in fluid communication with first end 231a of second coiled pipe 230 utilizing a first insulated pipe 226a and second end 221b of first coiled pipe 220 may be connected in fluid communication with second end 231b of second coiled pipe 230 utilizing a second insulated pipe 226b. In an exemplary embodiment, the entire volume of first coiled pipe 220, second coiled pipe 230, first insulated pipe 226a, and second insulated pipe 226b may be filled with an exemplary working fluid, such as water. In an exemplary embodiment, such connection of first coiled pipe 220 and second coiled pipe 230 utilizing first and second insulated pipes (226a, 226b) may allow for forming a close loop, through which an exemplary working fluid, such as water may be circulated utilizing pumping mechanism 232.

In an exemplary embodiment, pumping mechanism 232 may be configured to urge an exemplary working fluid to flow though first coiled pipe 220 from first end 221a of first coiled pipe 220 toward second end 221b of first coiled pipe 220. In an exemplary embodiment, pumping mechanism 232 may further be configured to pump an exemplary working fluid from second end 221b of first coiled pipe 220 to second end 231b of second coiled pipe 230. In an exemplary embodiment, pumping mechanism 232 may further be configured to urge an exemplary working fluid to flow within second coiled pipe 230 from second end 231b of second coiled pipe 230 toward first end 231a of second coiled pipe 230.

In an exemplary embodiment, second coiled pipe 230 may be coiled around a portion 223 of exhaust pipe 222 between engine 242 of motorcycle 202 and a muffler 224 of exhaust pipe 222 of motorcycle 202. In an exemplary embodiment, since muffler 224 is usually insulated, an efficient heat transfer between hot gases passing through muffler 224 and second coiled pipe 230 may not be achievable, consequently, second coiled pipe 230 may only be mounted around portion 223. However, in an exemplary embodiment, second coiled pipe 230 may be coiled around an entire length of exhaust pipe 232 including around muffler 224.

In an exemplary embodiment, second coiled pipe 230 may be in direct contact with an outer surface of exhaust pipe 232 from an inner side of second coiled pipe 230 and second coiled pipe 230 may be in contact with surrounding environment from an opposing outer side of second coiled pipe 230. In an exemplary embodiment, in order to prevent any unwanted heat loss to the surrounding environment, an insulation 244 may be wrapped around second coiled pipe 230. In an exemplary embodiment, insulation 244 may include at least one of a ceramic fiber blanket, glass wool, steel wool covered utilizing silicon. In an exemplary embodiment, insulation 244 may include a three-layer insulation, where a first layer in direct contact with second coiled pipe 230 may be made of fiberglass sheets, a second layer may be made of fireproof ceramic fiber blanket, and a third outermost layer made of a ceramic coating.

In an exemplary embodiment, an inner layer may be utilized between exhaust pipe 222 and second coiled pipe 230 that may be made of a porous metal layer, such as steel wool. The porous metal layer may improve heat transfer from exhaust pipe 222 to second coiled pipe 230. In other words, heat may be transferred to the inner layer and then from the inner layer to second coiled pipe 230.

In an exemplary embodiment, food container 204 may further include a first divider 206 that may be configured to separate an inner volume of food container 204 into an exchanger housing 246 and at least one inner chamber 208. In an exemplary embodiment, first divider 206 may be configured to cover first heat exchanger 218 and first divider 206 may be made of heat conducting materials. In an exemplary embodiment, such separation of first heat exchanger 218 form at least one inner chamber 108 may allow for an indirect heating of at least one inner chamber 208 utilizing first heat exchanger 218 without food 210 coming in direct contact with first heat exchanger 218. Furthermore, in an exemplary embodiment, such division of the inner volume of food container 204 into exchanger housing 246 and at least one inner chamber 208 may allow for cleaning and sterilizing inner walls of at least one inner chamber 208 and prevent any contamination of leakage to come in contact with food 210 from exchanger housing 246.

In an exemplary embodiment, food container 204 may further include a fan 236 that may be mounted in exchanger housing 246. In an exemplary embodiment, fan 236 may be configured to circulate the heated air of exchanger housing 246 within an inner volume of at least one inner chamber 208 to further facilitate heat transfer between first heat exchanger 218 and food 210 by changing the heat transfer mechanism to a forced convection mechanism.

Regarding sterilizing at least one inner chamber 208, in an exemplary embodiment, at least one inner chamber 208 may further be equipped with at least one ultraviolet (UV) light source 248, where at least one ultraviolet light source 248 may be configured to shine ultraviolet light within at least one inner chamber 208 to sanitize at least one inner chamber 208. In an exemplary embodiment, shining UV light within at least one inner chamber 208 may ensure a microorganism-free environment within at least one inner chamber 208.

In an exemplary embodiment, food container 204 may further be configured to be utilized for storage and delivery of both hot and cold food. To this end, in an exemplary embodiment, at least one inner chamber 208 may include two separate chambers that may be isolated from each other, one for storing hot food and one for storing cold food and drinks.

Figure 2C:
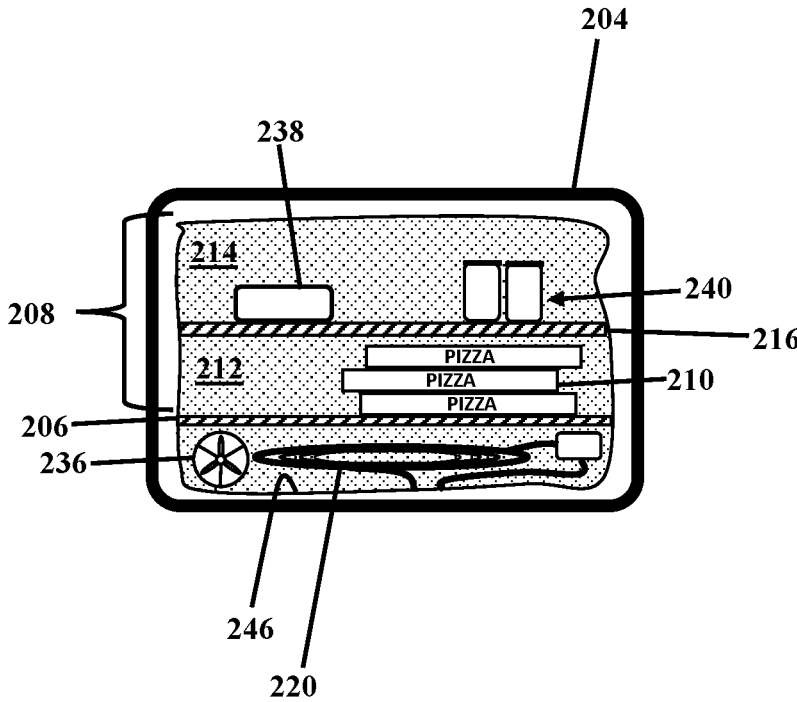
FIG. 2C illustrates a sectional side-view of a food container, consistent with one or more exemplary embodiments of the present disclosure.

FIG. 2C illustrates a sectional side-view of food container 204, consistent with one or more exemplary embodiments of the present disclosure. In an exemplary embodiment, at least one inner chamber 208 may include a heated chamber 212 that may be configured for storage and heating of food 210 and a cold chamber 214 that may be configured for storing and keeping food and beverages 240 cold. In an exemplary embodiment, food container 204 may further include a second divider 216 that may be utilized for dividing the inner volume of at least one inner chamber 208 into heated chamber 212 and cold chamber 214. In an exemplary embodiment, second divider 216 may be made of heat insulating materials, such that no heat may leak from heated chamber 212 into cold chamber 214. In an exemplary embodiment, phase change materials (PCMs) may be utilized in cold chamber 214 to maintain the temperature of cold chamber 214 at a desired level.

Figure 3:
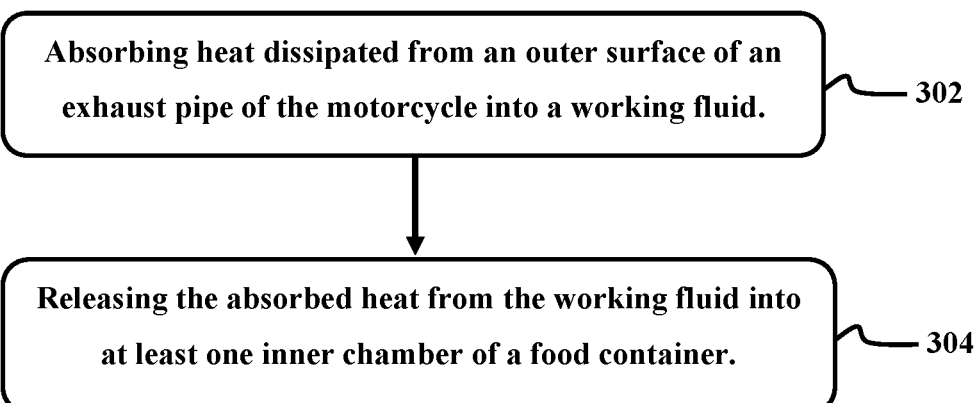
FIG. 3 illustrates a flowchart of a method for heating food during transportation, consistent with one or more exemplary embodiments of the present disclosure.

FIG. 3 illustrates a flowchart of a method 300 for heating food during transportation, consistent with one or more exemplary embodiments of the present disclosure. In an exemplary embodiment, method 300 may be implemented by a heating system similar to heating systems (100 and 200). In an exemplary embodiment, method 300 may include a step 302 of absorbing heat dissipated from an outer surface of an exhaust pipe of the motorcycle into a working fluid and a step 304 of releasing the absorbed heat from the working fluid into at least one inner chamber of a food container, in which hot food and beverages may be stored.

In an exemplary embodiment, step 302 of absorbing heat dissipated from an outer surface of an exhaust pipe of the motorcycle into a working fluid may involve coiling a first pipe around the exhaust pipe of the motorcycle. For example, a pipe made of a heat conductive material such as copper may be coiled around an exhaust pipe of a motorcycle, such as first coiled pipe 220 that may be coiled around exhaust pipe 222 of motorcycle 202. In an exemplary embodiment, coiling the first pipe around an exhaust pipe of a motorcycle may include placing the first pipe in direct contact with an outer surface of the exhaust pipe. For example, first coiled pipe 220 may be mounted on exhaust pipe 222 such that first coiled pipe 220 may be in direct contact with an outer surface of exhaust pipe 222. In an exemplary embodiment, coiling the first pipe around an exhaust pipe of a motorcycle may include coiling the first pipe around a portion of the exhaust pipe between an engine of the motorcycle and a muffler of the exhaust pipe. For example, first coiled pipe 220 may be coiled around portion 223 of exhaust pipe 222 between engine 242 and muffler 224.

In an exemplary embodiment, step 302 of absorbing heat dissipated from an outer surface of an exhaust pipe of the motorcycle into a working fluid may further involve pumping a working fluid through the first pipe. For example, a working fluid such as water may be pumped through a first pipe such as first coiled pipe 220 utilizing a pumping mechanism, such as pumping mechanism 232.

In an exemplary embodiment, step 304 of releasing the absorbed heat from the working fluid into at least one inner chamber of a food container may involve coiling a second pipe such as second coiled pipe 230 within a food container, such as food container 204, and connecting the second pipe with the first pipe to allow the working fluid to flow through the second pipe. For example, second coiled pipe 230 may be connected to first coiled pipe 220 utilizing first insulated pipe 226a and second insulated pipe 226b.

Figure 4:
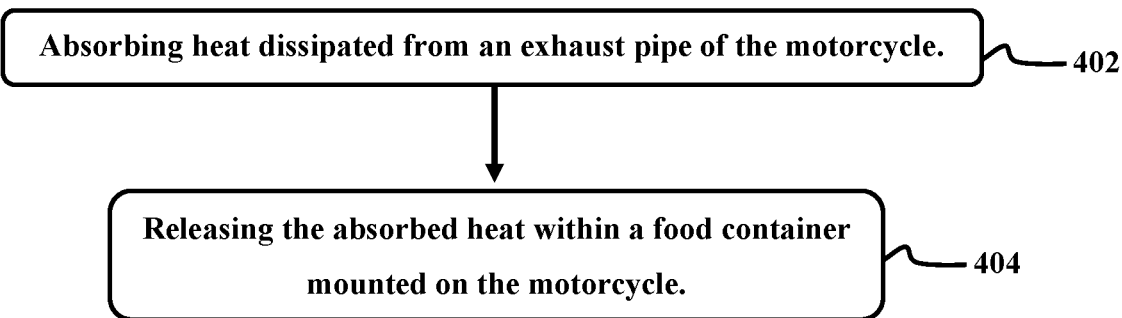
FIG. 4 illustrates a flowchart of a method for heating food during transportation, consistent with one or more exemplary embodiments of the present disclosure.

FIG. 4 illustrates a flowchart of a method 400 for heating food during transportation, consistent with one or more exemplary embodiments of the present disclosure. In an exemplary embodiment, method 400 may be similar to method 300 and may be implemented by a heating system similar to heating systems (100 and 200). In an exemplary embodiment, method 400 may include a step 402 of absorbing heat dissipated from an exhaust pipe of a motorcycle and a step 404 of releasing the absorbed heat within a food container mounted on the motorcycle.

In an exemplary embodiment, step 402 of releasing the absorbed heat within the food container may include placing a working fluid in an indirect contact with an exhaust pipe, such as exhaust pipe 222 by pumping the working fluid into a first coiled pipe, such as first coiled pipe 220 mounted around the exhaust pipe to obtain a heated working fluid.

In an exemplary embodiment, step 404 of releasing the absorbed heat within the food container may include placing the heated working fluid in indirect contact with an inner volume of a food container, such as food container 204 by pumping the heated working fluid through a second coiled pipe, such as second coiled pipe 230 mounted within the food container.

In an exemplary embodiment, step 404 of releasing the absorbed heat within the food container may further include circulating air within the food container utilizing a fan, such as fan 236 mounted within the food container.

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for description and not of limitation, such that the terminology or phraseology of the present specification is to be interpreted by the skilled artisan in light of the teachings and guidance.

The breadth and scope of the present disclosure should not be limited by any of the above-described exemplary embodiments but should be defined only in accordance with the following claims and their equivalents.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps. Moreover, the word "substantially" when used with an adjective or adverb is intended to enhance the scope of the particular characteristic, e.g., substantially planar is intended to mean planar, nearly planar and/or exhibiting characteristics associated with a planar element. Further use of relative terms such as "vertical", "horizontal", "up", "down", and "side-to-side" are used in a relative sense to the normal orientation of the apparatus.

What is claimed is:

1. A heating system for food transportation, the system comprising:

a food container configured to be mounted on a motorcycle, the food container comprising at least one inner chamber;

a first heat exchanger configured to heat the at least one inner chamber, the first heat exchanger comprising a first coiled pipe mounted within the food container;

a second heat exchanger connected in fluid communication with the first heat exchanger, the second heat exchanger comprising a second coiled pipe coiled around an exhaust pipe of the motorcycle;

a working fluid contained within the first coiled pipe and the second coiled pipe; and a pumping mechanism configured to urge the working fluid to flow through the first coiled pipe and the second coiled pipe in a closed circulation loop, wherein the working fluid is configured to absorb heat from the exhaust pipe of the motorcycle as the working fluid flows through the second coiled pipe, and wherein the working fluid is further configured to release the absorbed heat to the at least one inner chamber as the working fluid flows through the first coiled pipe.

2. The heating system of claim 1, wherein a first end of the first coiled pipe is connected to a first end of the second coiled pipe, and a second end of the first coiled pipe is connected to a second end of the second coiled pipe via the pumping mechanism.

3. The heating system of claim 1, wherein the pumping mechanism is configured to urge the working fluid to flow though the first coiled pipe from the first end of the first coiled pipe toward the second end of the first coiled pipe, the pumping mechanism further configured to pump the working fluid from the second end of the first coiled pipe to the second end of the second coiled pipe, the pumping mechanism further configured to urge the working fluid to flow within the second coiled pipe from the second end of the second coiled pipe toward the first end of the second coiled pipe.

4. The heating system of claim 3, further comprising reservoir mounted between the second end of the first coiled pipe and the pumping mechanism, the reservoir configured to accumulate the working fluid upstream from the pumping mechanism.

5. The heating system of claim 4, wherein the first coiled pipe and the second coiled pipe are made of heat conducting materials.

6. The heating system of claim 5, wherein the second coiled pipe is coiled around a portion of the exhaust pipe between an engine of the motorcycle and a muffler of the exhaust pipe of the motorcycle.

7. The heating system of claim 6, wherein the second coiled pipe is in direct contact with an outer surface of the exhaust pipe of the motorcycle, and the second coiled pipe is insulated from the environment.

8. The heating system of claim 6, wherein the food container further comprises a first divider, the first divider configured to divide an inner volume of the food container into an exchanger housing and the at least one inner chamber, the exchanger housing configured to house the first heat exchanger.

9. The heating system of claim 8, wherein the food container further comprises a fan, the fan configured to circulate the air between the at least one inner chamber and the exchanger housing.

10. The heating system of claim 9, the at least one inner chamber comprises a heated chamber and a cold chamber, the heated chamber is in fluid communication with the exchanger housing via the fan, the cold chamber isolated from the heated chamber utilizing a second divider, the second divider comprising a heat isolating material.

11. The heating system of claim 9, wherein the working fluid comprises water.

12. The heating system of claim 9, wherein the at least one inner chamber further comprises at least one ultraviolet light source, the at least one ultraviolet light source configured to shine ultraviolet light within the at least one inner chamber.

5

\* \* \* \* \*